United States Patent
Gehrling et al.

(10) Patent No.: US 11,223,775 B2
(45) Date of Patent: Jan. 11, 2022

(54) METHOD AND APPARATUS FOR THE SPATIALLY RESOLVED DETECTION OF AN OBJECT OUTSIDE A TRANSPORTATION VEHICLE WITH THE AID OF A SENSOR INSTALLED IN A TRANSPORTATION VEHICLE

(71) Applicant: VOLKSWAGEN AKTIENGESELLSCHAFT, Wolfsburg (DE)

(72) Inventors: Sebastian Gehrling, Essen (DE); Jens Kampermann, Haan (DE); Sarah Strygulec, Wuppertal (DE); Sven Klomp, Dollbergen (DE); Jessica Apfel, Paderborn (DE); Sandra Jürgensmeier, Delbrück (DE); Wolfgang Theimer, Bochum (DE); Ernst Zielinski, Bochum (DE); Esref Köse, Bochum (DE); Ahmed Ali, Bochum (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/612,566

(22) PCT Filed: Apr. 10, 2018

(86) PCT No.: PCT/EP2018/059209
§ 371 (c)(1),
(2) Date: Nov. 11, 2019

(87) PCT Pub. No.: WO2018/206213
PCT Pub. Date: Nov. 15, 2018

(65) Prior Publication Data
US 2021/0084227 A1   Mar. 18, 2021

(30) Foreign Application Priority Data
May 11, 2017   (DE) ..................... 10 2017 207 960.6

(51) Int. Cl.
*H04N 5/232* (2006.01)
*G06K 9/00* (2006.01)
*G06K 9/32* (2006.01)

(52) U.S. Cl.
CPC ..... *H04N 5/23299* (2018.08); *G06K 9/00791* (2013.01); *G06K 9/00845* (2013.01); *G06K 9/3233* (2013.01)

(58) Field of Classification Search
None
See application file for complete search history.

(56) References Cited

U.S. PATENT DOCUMENTS 8,862,380 B2   10/2014   Jung
9,311,527 B1    4/2016   Yin et al.
(Continued)

FOREIGN PATENT DOCUMENTS

DE        10131720 A1    1/2003
DE     102010061922 A1    4/2012
(Continued)

OTHER PUBLICATIONS

Search Report for International Patent Application No. PCT/EP2018/059209; dated Aug. 3, 2018.

*Primary Examiner* — Kate H Luo
(74) *Attorney, Agent, or Firm* — Barnes & Thornburg LLP

(57) ABSTRACT

A method for the spatially resolved detection of an object outside a transportation vehicle with the aid of a sensor installed in a transportation vehicle wherein the viewing direction of a transportation vehicle occupant is captured. The captured viewing direction is analyzed over a period and a region of interest outside the transportation vehicle is determined. The sensor is then spatially sensitized and/or oriented in the direction of the determined region of interest.

8 Claims, 4 Drawing Sheets

(56) References Cited

U.S. PATENT DOCUMENTS

| | | |
|---|---|---|
| 9,445,047 B1 | 9/2016 | Frueh et al. |
| 2012/0089321 A1 | 4/2012 | Jung |
| 2016/0063347 A1 | 3/2016 | Kim |
| 2016/0068097 A1* | 3/2016 | Langkabel ............. B60Q 1/085 362/464 |
| 2016/0085301 A1 | 3/2016 | Lopez |
| 2016/0144786 A1* | 5/2016 | Lee .......................... B60R 1/00 348/148 |
| 2016/0185293 A1* | 6/2016 | Gieseke .................. G06F 3/017 348/115 |
| 2016/0210503 A1 | 7/2016 | Yin et al. |
| 2017/0108925 A1* | 4/2017 | Mueller ................ B60W 40/08 |
| 2017/0364760 A1* | 12/2017 | Canella ..................... G06T 7/75 |

FOREIGN PATENT DOCUMENTS

| | | |
|---|---|---|
| DE | 102011084217 A1 | 4/2013 |
| DE | 102013201545 A1 | 7/2014 |
| DE | 102014109079 A1 | 12/2014 |
| DE | 102015108416 A1 | 12/2015 |
| DE | 102014217732 A1 | 3/2016 |
| EP | 1691670 A1 | 8/2006 |
| EP | 2389095 A1 | 11/2011 |
| EP | 2490584 A1 | 8/2012 |
| EP | 3038348 A1 | 6/2016 |

\* cited by examiner

METHOD AND APPARATUS FOR THE SPATIALLY RESOLVED DETECTION OF AN OBJECT OUTSIDE A TRANSPORTATION VEHICLE WITH THE AID OF A SENSOR INSTALLED IN A TRANSPORTATION VEHICLE

PRIORITY CLAIM

This patent application is a U.S. National Phase of International Patent Application No. PCT/EP2018/059209, filed 10 Apr. 2018, which claims priority to German Patent Application No. 10 2017 207 960.6, filed 11 May 2017, the disclosures of which are incorporated herein by reference in their entireties.

SUMMARY

Illustrative embodiments relate to a method for the spatially resolved detection of an object outside a transportation vehicle with the aid of a sensor installed in a transportation vehicle. Illustrative embodiments also relate to an apparatus for carrying out the method and to a transportation vehicle which is configured to carry out such a method or which has such an apparatus.

BRIEF DESCRIPTION OF THE DRAWINGS

Further features of the disclosed embodiments become apparent from the following description and the claims in conjunction with the figures.

DETAILED DESCRIPTION

Figure 1:
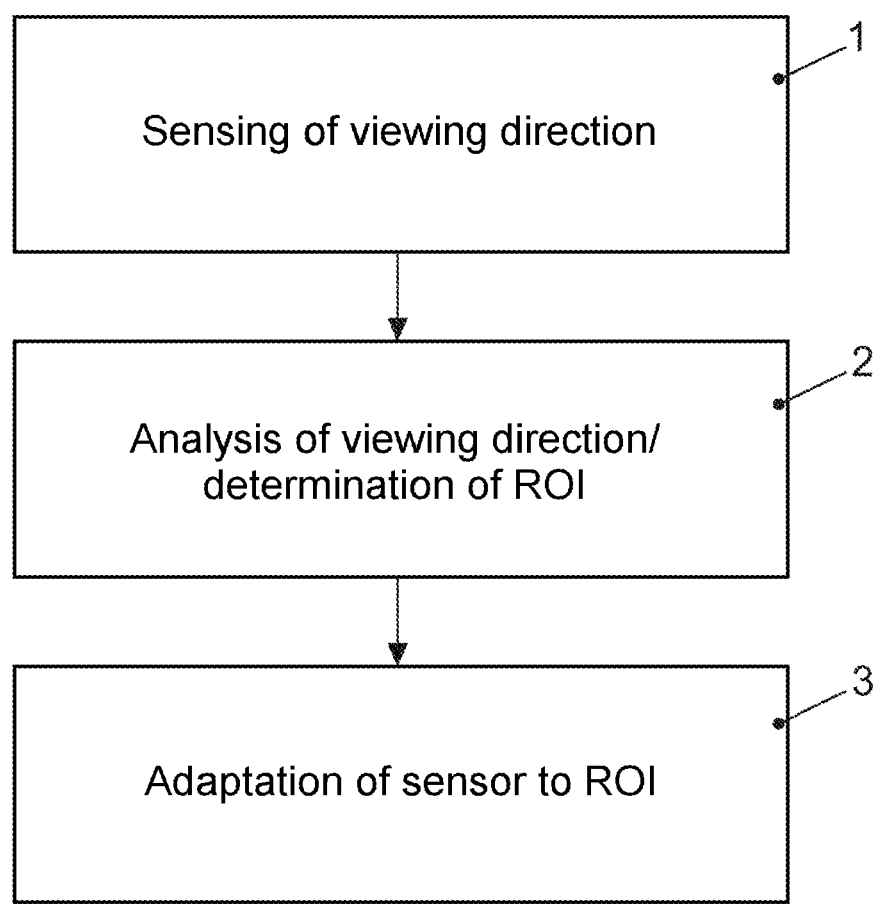
FIG. 1 shows a schematic view of the disclosed method for optimizing transportation vehicle sensors based on the sensed viewing direction of a transportation vehicle occupant.

A large number of different types of driver assistance systems which can assist the driver in transportation vehicles have become known. To a certain extent, the driver assistance systems are limited only to signaling functions or warning functions, but to a certain extent they also intervene in the drive or the control of the transportation vehicle. Both activities require knowledge of the current transportation vehicle situation which is acquired on the basis of data from suitable sensors. The sensors can in this context determine technical parameters of the transportation vehicle itself such as, e.g., for a driving stabilization system (ESP) or anti-lock brake system (ABS) or else information about the surroundings of the transportation vehicle. In this context, various technologies, frequently also in combination, are used for observing the surroundings of the transportation vehicle and for assistance functions based thereon, such as parking aids, automatic distance warning systems and distance control systems, road sign detection systems, blind spot monitoring systems or emergency brake systems for protecting pedestrians. Ultrasonic systems, radar systems, lidar systems and camera systems are frequently used to identify objects in the surroundings of the transportation vehicle such as pedestrians, other transportation vehicles, road signs etc. In this context, the sensor data of a plurality of sensors can firstly be evaluated individually, objects in the surroundings of the transportation vehicle can be identified in these respective sensor data, and the information which relates to the detected objects and which is made available by the various sensors can then be combined to form a comprehensive model of the surroundings.

The combination or linking of the output data of a plurality of sensors, also referred to as sensor data fusion, is carried out with the objective of improving the quality of the acquired information, whether in terms of increasing the detection range or making the detection and, if appropriate, classification of objects more precise or more reliable. If, for example, the acquired information of one or more sensors is not reliable, this can be partially or completely compensated for by data from further sensors. However, it is also possible to confirm information which is already present by data from further sensors.

A further approach for optimizing the sensing of objects in the surroundings of the transportation vehicle and for modeling the surroundings of the transportation vehicle consists in defining one or more regions of interest in which relevant information is assumed to be during the evaluation of the sensor signals. If these regions of interest (ROI) are suitably selected, it is possible to reduce incorrect detection, increase the robustness of the system and speed up decision processes. It is therefore possible, for example, in the case of image signals of a camera, firstly to search through the image data for regions of interest, which are subsequently subjected to more precise image processing and object detection. In this context it is known to apply tracking methods in which detected objects are tracked chronologically on the basis of models, and therefore to predict regions of interest for future points in time. However, to be able to track a new object, initialization must first be carried out for this.

A method for producing a model of the surroundings for a transportation vehicle is known from DE 10 2013 201 545 A1. Here, sensor data from a plurality of sensors are evaluated to detect objects, wherein one or more regions of interest in a model of the surroundings are also determined and used for the detection of an object or a property of the object.

Disclosed embodiments make available an improved method for the spatially resolved detection of an object outside a transportation vehicle with the aid of a sensor installed in a transportation vehicle.

Disclosed embodiments provide a method and a corresponding device.

In the disclosed method for the spatially resolved detection of an object outside a transportation vehicle with the aid of a sensor installed in a transportation vehicle, the viewing direction of a transportation vehicle occupant is sensed. The sensed viewing direction is analyzed over a time period and a region of interest outside the transportation vehicle is determined therefrom. The sensor is then spatially sensitized and/or oriented in the direction of the determined region of interest.

This improves both the determination of regions of interest outside the transportation vehicle and the initialization of the tracking of an object which is to be newly tracked. Likewise, when there are a plurality of detected objects, this makes available information about which of the objects has priority for the transportation vehicle occupant.

According to at least one disclosed embodiment, in addition to the viewing direction of the transportation vehicle occupant, the convergence of the transportation vehicle occupant's eyes is also determined to determine the spatial distance of the region of interest. The sensor can therefore be sensitized and/or oriented to detect the object outside the transportation vehicle even more precisely.

According to a further disclosed embodiment, a confidence value for a spatial region is determined, wherein the confidence value depends on the duration and/or frequency of the consideration by the transportation vehicle occupant. The spatial region is determined as a region of interest if the confidence value exceeds a threshold value. With such a confidence value it is possible to quantify the sensing of the viewing direction particularly well and therefore to make the determination of a region of interest particularly reliable.

The threshold value may depend on the physical or mental state of the transportation vehicle occupant and/or parameters outside the transportation vehicle such as road conditions, traffic conditions or weather conditions. The determination of a region of interest can therefore be adapted to changed parameters, with the result that the reliability is increased further.

According to a further disclosed embodiment, the transportation vehicle occupant is informed about the region of interest (ROI), or about an object which is located in the region of interest, by a display, for example, by a projected frame around the region of interest or the object. In this way, it can be clarified to the transportation vehicle occupant that the object under consideration has been sensed and is taken into account by the transportation vehicle sensor system and, if appropriate, an assistance system, and therefore the confidence in the assistance system can increase.

The method can be applied if the viewing direction of the driver of the transportation vehicle is sensed, since the driver considers the surroundings of the transportation vehicle most attentively to be able to drive the transportation vehicle safely. In addition, the driver knows in what direction he will steer the transportation vehicle, and therefore also in what direction objects outside the transportation vehicle are relevant because they could, for example, intersect the future transportation vehicle trajectory. Finally, camera systems which sense the driver's eyes are, under certain circumstances, already provided in the transportation vehicle, for example, to detect driver fatigue which occurs and to react thereto, and the systems can therefore be used without additional costs for a further camera system.

Correspondingly, a disclosed apparatus for the spatially resolved detection of an object outside a transportation vehicle with the aid of a first sensor installed in a transportation vehicle comprises a second sensor for sensing the viewing direction of a transportation vehicle occupant;

an evaluation and control unit to which sensor data of the second sensor about the sensed viewing direction are fed, and which analyzes the sensor data over a time period and determines therefrom a region of interest outside the transportation vehicle, and actuates the first sensor in such a way that it is spatially sensitized and/or oriented in the direction of the determined region of interest.

It is possible that the first sensor is a camera sensor, radar sensor, lidar sensor or ultrasonic sensor which is oriented toward surroundings of the transportation vehicle, and the second sensor is a camera sensor which is oriented toward the transportation vehicle occupants in the transportation vehicle.

It is beneficial in this context if a display apparatus, for example, a head-up display, is arranged in the transportation vehicle and is used to inform the transportation vehicle occupant about the region of interest or about an object which is located in the region of interest.

The disclosed method or the disclosed apparatus may be used in a transportation vehicle.

For the sake of better understanding of the principles of the present disclosure, illustrative embodiments are explained in more detail below with reference to the figures. Of course, the disclosure is not restricted to these embodiments and the described features can also be combined or modified without departing from the scope of protection of the disclosure as defined in the claims.

FIG. 1 shows a schematic view of the disclosed method for the spatially resolved detection of an object outside a transportation vehicle with the aid of a sensor installed in a transportation vehicle. According to method operation at 1, the viewing direction of a transportation vehicle occupant, in particular, of the driver of a transportation vehicle, is sensed. For this, the position of the eyes, the viewing direction of the transportation vehicle occupant and, if appropriate, also the convergence of the eyes of the transportation vehicle occupant are determined by an eye tracking method, and a position outside the transportation vehicle is derived therefrom. The sensed viewing direction is analyzed in a method operation at 2 over a certain time period. If it becomes apparent here that the transportation vehicle occupant continuously considers a specific region outside the transportation vehicle or follows an object such as, e.g., a transportation vehicle travelling ahead, this region is defined as a region of interest (ROI) for the sensor system, since a region on which the transportation vehicle occupant focuses his attention has a high probability of containing information which is also significant for the sensor system for observing the external region. Then, in method operation at 3, the sensor is spatially sensitized and/or oriented in the direction of the determined region of interest (ROI).

The transportation vehicle occupant can already observe an object before it moves into the detection range of the sensors which are present. As a result, this range is already known as a region of interest (ROI) for the sensor system in advance, with the result that an object in this range can then be detected immediately by the sensors if it moves into the detection range.

Figure 2:
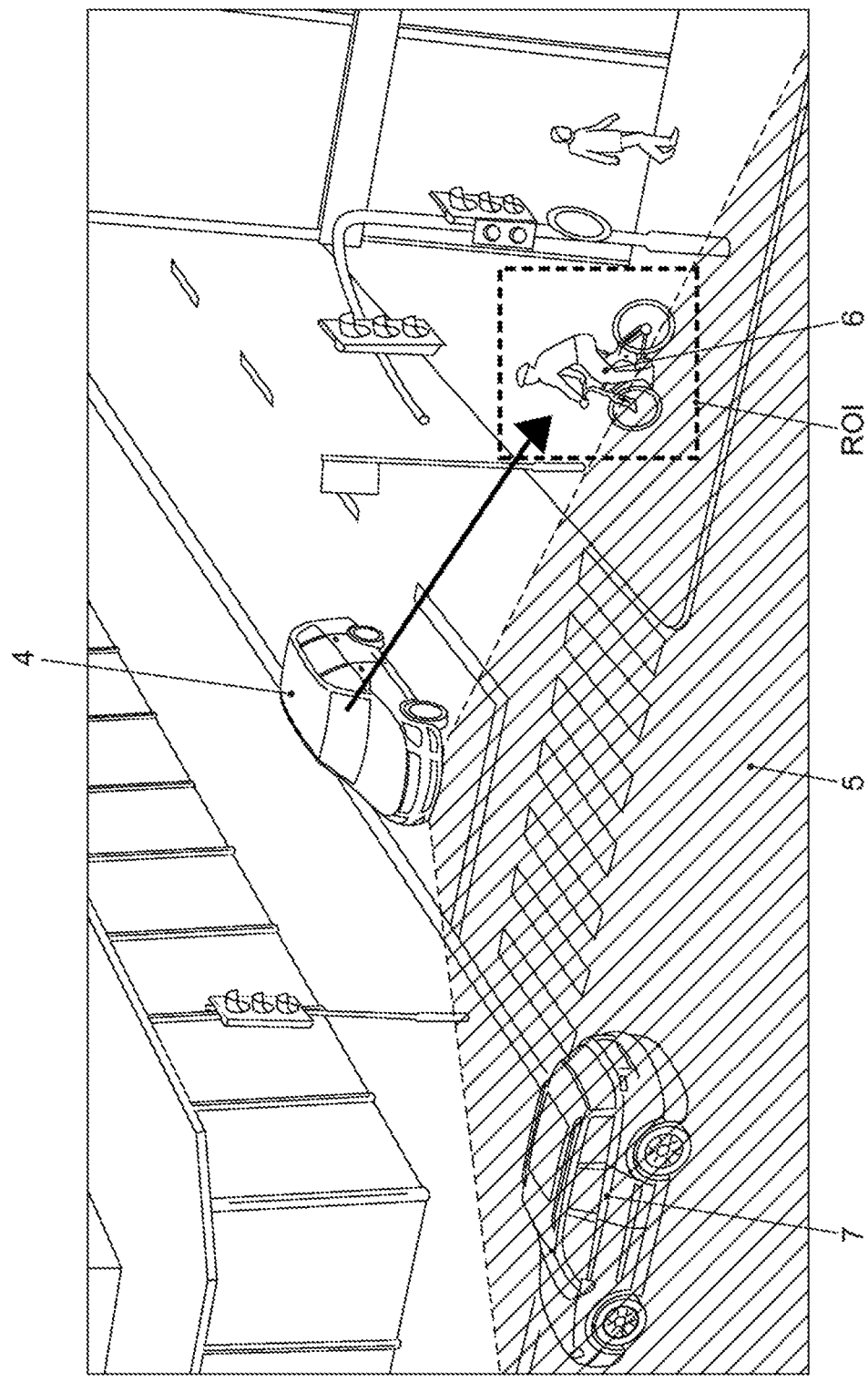
FIG. 2 shows the application of a disclosed embodiment in the example of a traffic intersection in which an object is not yet sensed by the transportation vehicle sensor system but is already known to the system owing to consideration by the driver.

This is presented for the sake of illustration in FIG. 2. An ego transportation vehicle 4 with a suitable sensor system for sensing the surroundings of the transportation vehicle is located at an intersection, wherein the detection range 5 of the sensor system is illustrated by hatching. A transportation vehicle 7 driving past is located in this detection range and is therefore detected by the sensor system of the ego transportation vehicle 4. In contrast, a cyclist 6 is not yet located in the detection range. However, if the driver concentrates his view on this cyclist, for example, to be certain whether the cyclist is crossing the roadway in front of the ego transportation vehicle, this is sensed according to the disclosure and a region of interest ROI in the vicinity of the cyclist is passed onto the external sensor system. The external sensor system is therefore already aware, before the actual sensing, that a relevant object is located in the region of interest ROI.

Figure 3:
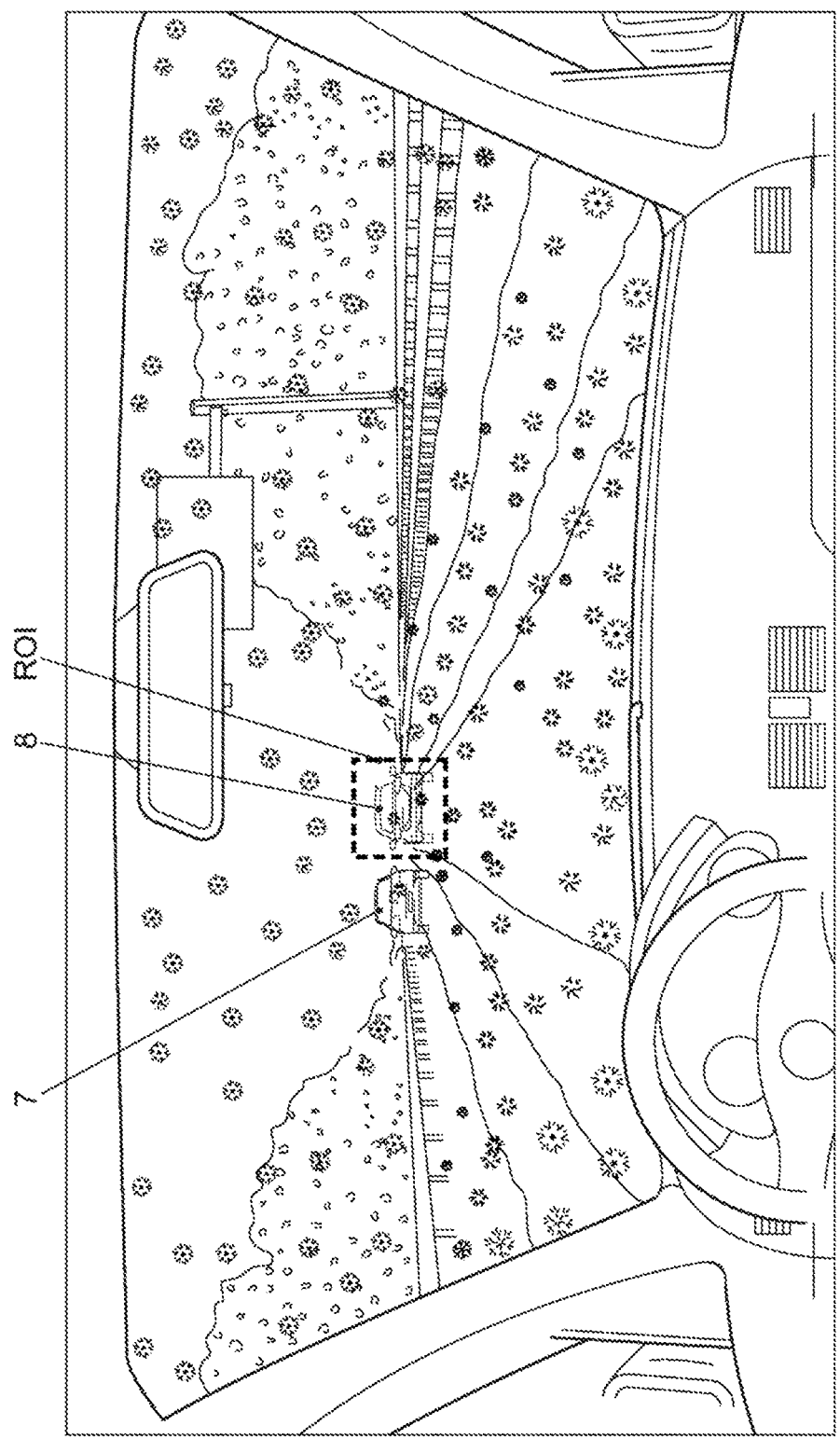
FIG. 3 shows the application of a disclosed embodiment in the example of a traffic situation with poor weather conditions.

FIG. 3 shows a further scenario in which the sensed viewing direction of the transportation vehicle occupant can be used to optimize the sensing of the surroundings of the transportation vehicle. Here, poor visibility conditions give rise to contradictory hypotheses about the presence of objects between a radar sensor system and a camera sensor system. While the radar sensor system detects the transportation vehicle 8 which is located in front of the ego transportation vehicle on the same lane, the camera sensor system detects only the transportation vehicle 7 which is next to it on the left. For certain assistance systems it may then be necessary for the assistance system nevertheless to decide on a hypothesis even though the interpretation of the observations of the surroundings on the basis of the sensor data is not unambiguous. This can be optimized by the evaluation of the viewing direction of the driver. If the driver concentrates his view for a large part of the time on the transportation vehicle 8 driving in front of him, the hypothesis of the radar is supported.

The evaluation of the viewing direction can also be useful to prioritize objects when a plurality thereof are detected by the transportation vehicle sensor system. Should the detected objects have the same relevance for the transportation vehicle sensor system, but the driver only considers one of these objects or considers one for a significantly longer time than the other detected objects, then it can be inferred that this object is relevant from the driver's point of view.

This may be of interest if sensors are used which cannot differentiate different detected objects. For example, a radar system or lidar system cannot differentiate—in contrast to a camera with algorithms for image evaluation connected downstream—whether an object is fixed at the edge of the road, such as, for example, a road sign or a trash can, or possibly risks moving onto the road, such as, for example, in the case of a cyclist or a playing child.

However, even if a camera is used to sense the surroundings of the transportation vehicle, the evaluation of the viewing direction of the transportation vehicle occupant can be beneficial, since the image evaluation, in particular, in the case of high-resolution cameras with sufficient image repetition rate, is very costly owing to the resulting volume of video data, and is therefore very expensive in real time. In contrast, the evaluation of the viewing direction of the transportation vehicle occupant makes it possible to limit the image analysis to the pixels in a region of interest which corresponds to the viewing direction.

Figure 4:
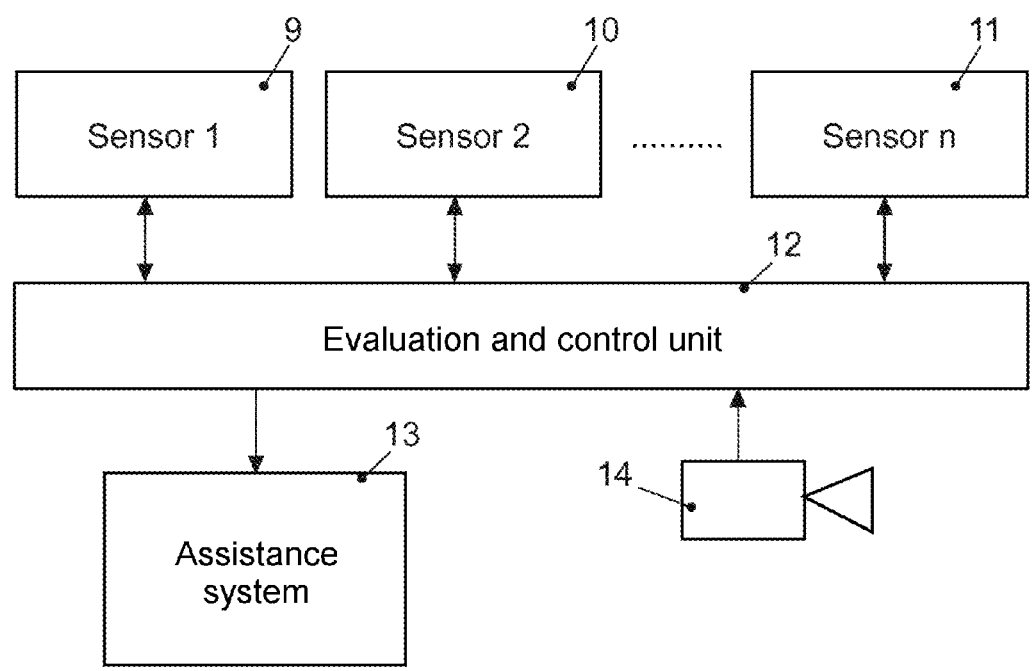
FIG. 4 shows a schematic view of a block circuit diagram of a disclosed apparatus.

FIG. 4 shows a schematic block circuit diagram of a disclosed apparatus. A plurality of sensors 9, 10, 11 which are installed in a transportation vehicle are provided for sensing the surroundings of the transportation vehicle, these being, for example, camera sensors, radar sensors, lidar sensors and/or ultrasonic sensors. The sensor data are fed to an evaluation and control unit 12 in which the sensor data are evaluated to be able to actuate a driver assistance system 13 based thereon. A further sensor 14, which senses the viewing direction of a transportation vehicle occupant, is additionally provided in the transportation vehicle. The position of the driver's head can be sensed by a camera arranged in the passenger compartment of the transportation vehicle, and the position of the eyes and viewing direction of the driver can be determined by suitable image analysis methods. This may involve an NIR (near infrared) camera which senses short-wavelength infrared radiation which directly adjoins the visible range. In this case, illumination, in particular, in the dark, can be provided by one or more NIR-LEDs (not illustrated) without this being disruptive for the driver or being able to dazzle him. The NIR camera and the NIR-LEDs can be installed separately or else also in a common sensor component. The sensed viewing direction is analyzed in the evaluation and control unit 12 over a certain time period, and a region of interest outside the transportation vehicle is determined therefrom, and on the basis thereof at least one of the sensors 9, 10, 11 is spatially sensitized and/or oriented in the direction of this region of interest.

If just one transportation vehicle occupant, such as the driver, is situated in the transportation vehicle, it inevitably follows that only his viewing direction can be evaluated. However, even in the case of a plurality of transportation vehicle occupants, it is useful to sense the viewing direction of the driver, since the driver, on the one hand, considers the surroundings of the transportation vehicle most attentively to be able to drive the transportation vehicle safely. In addition, the driver knows in what direction he will steer the transportation vehicle, and therefore also in what direction objects outside the transportation vehicle are relevant because they could, for example, intersect the future transportation vehicle trajectory. Finally, camera systems which sense the driver's eyes are, under certain circumstances, already provided in the transportation vehicle, for example, to detect driver fatigue which occurs and to react thereto. However, the viewing direction of further transportation vehicle occupants, in particular, of the front seat passenger, can also be sensed and used according to the disclosure. This may be beneficial, for example, when an object outside the transportation vehicle is partially or completely concealed from the driver's position, but is more clearly visible to the front seat passenger. For example, for the driver, concealment may arise as a result of further objects outside the transportation vehicle, such as, for example, road signs or traffic lights, or else as a result of parts of the transportation vehicle, such as, for example, the A pillar on the front seat passenger's side of the transportation vehicle, which concealment, on the other hand, does not occur for the front seat passenger owing to the different sitting position. Finally, the viewing direction of a transportation vehicle occupant can, however, also be evaluated if the transportation vehicle is in an autonomous driving mode.

In addition to objects in regions in front of or next to the transportation vehicle, it is also possible for objects which are located behind the transportation vehicle to be sensed in that the driver's view into the rear-view mirror or the side mirrors is sensed in a spatially resolved way and evaluated.

The disclosed embodiments can be used in any desired fields of transportation vehicle technology.

LIST OF REFERENCE SYMBOLS

1 Method operation with sensing of the viewing direction
2 Method operation with analysis of the viewing direction and determination of a region of interest
3 Method operation with adaptation of a sensor to the determined region of interest
4 Ego transportation vehicle
5 Detection range of the sensor system
6, 7, 8 Objects outside the transportation vehicle
9, 10, 11 Sensors
12 Evaluation and control unit
13 Assistance system
14 Camera for observing the transportation vehicle occupant
ROI Region of interest

The invention claimed is:

1. A method for spatially resolved detection of an object located outside a transportation vehicle with a sensor installed in the transportation vehicle, the method comprising:
sensing a viewing direction of a transportation vehicle occupant;
analyzing the sensed occupant viewing direction over a time period and determining a region of interest of the occupant outside the transportation vehicle therefrom, wherein the region of interest is determined based on a duration and/or frequency of consideration of a spatial region by the occupant that is indicative of the occupant's focus on that spatial region;
orienting the sensor in a direction of the determined region of interest of the occupant,
wherein, as part of the determination of the region of interest, a confidence value for a spatial region is determined, wherein the confidence value depends on the duration and/or frequency of the consideration by the transportation vehicle occupant and the spatial region is determined as the region of interest in response to the confidence value exceeding a threshold value, wherein the threshold value depends on a physical or mental state of the occupant and/or parameters of environmental conditions outside the transportation vehicle.

2. The method of claim 1, further comprising convergence of eyes of the transportation vehicle occupant to determine a spatial distance to the region of interest.

3. The method of claim 1, further comprising informing the transportation vehicle occupant about the region of interest, or about an object which is located in the region of interest, via a display in the transportation vehicle.

4. The method of claim 1, wherein the transportation vehicle occupant is a driver of the transportation vehicle.

5. An apparatus for spatially resolved detection of an object located outside a transportation vehicle using a first sensor installed in a transportation vehicle, the apparatus comprising:
a second sensor for sensing a viewing direction of a transportation vehicle occupant;
an evaluation and control unit to which sensor data of the second sensor about the sensed viewing direction are input, and which analyzes the sensor data over a time period to determine therefrom a region of interest of the occupant outside the transportation vehicle,
wherein the region of interest is determined based on a duration and/or frequency of consideration of a spatial region by the occupant that is indicative of the occupant's focus on that spatial region,
wherein the evaluation and control unit actuates the first sensor so that the first sensor is oriented in a direction of the determined region of interest,
wherein, as part of the determination of the region of interest, a confidence value for a spatial region is determined, wherein the confidence value depends on the duration and/or frequency of the consideration by the transportation vehicle occupant and the spatial region is determined as the region of interest in response to the confidence value exceeding a threshold value, wherein the threshold value depends on a physical or mental state of the occupant and/or parameters of environmental conditions outside the transportation vehicle.

6. The apparatus of claim 5, wherein the first sensor is a camera sensor, radar sensor, lidar sensor or ultrasonic sensor, which is oriented toward surroundings of the transportation vehicle, and the second sensor is a camera sensor which is oriented toward transportation vehicle occupants in the transportation vehicle.

7. The apparatus of claim 5, wherein a display apparatus is arranged in the transportation vehicle and is used to inform the transportation vehicle occupant about the region of interest or about an object which is located in the region of interest.

8. A transportation vehicle including the apparatus of claim 5.

* * * * *